(12) United States Patent
Grenier et al.

(10) Patent No.: US 10,115,555 B1
(45) Date of Patent: Oct. 30, 2018

(54) ELECTRICAL SWITCH FOR A LOAD IN A VEHICLE

(71) Applicant: Amazon Technologies, Inc., Seattle, WA (US)

(72) Inventors: Taylor David Grenier, Seattle, WA (US); Liam Stewart Cavanaugh Pingree, Seattle, WA (US); Walker Chamberlain Robb, Seattle, WA (US); Richard Philip Whitlock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 357 days.

(21) Appl. No.: 14/969,716

(22) Filed: Dec. 15, 2015

(51) Int. Cl.
| | |
|---|---|
| *H01H 89/00* | (2006.01) |
| *H01H 13/14* | (2006.01) |
| *H01H 19/14* | (2006.01) |
| *B64D 31/02* | (2006.01) |
| *B64C 39/02* | (2006.01) |

(52) U.S. Cl.
CPC ........... *H01H 89/00* (2013.01); *B64C 39/024* (2013.01); *B64D 31/02* (2013.01); *H01H 13/14* (2013.01); *H01H 19/14* (2013.01); *B64C 2201/042* (2013.01); *B64C 2201/126* (2013.01); *H01H 2231/026* (2013.01)

(58) Field of Classification Search
CPC ................................ H01H 89/00; B64D 31/02
USPC ...... 200/1 B, 5 C, 17 B, 16 A, 143, 18, 245, 200/250, 290
See application file for complete search history.

(56) References Cited

U.S. PATENT DOCUMENTS

| | | | | | |
|---|---|---|---|---|---|
| 3,198,921 | A | * | 8/1965 | Clinton | H01H 19/56 200/1 B |
| 3,699,276 | A | * | 10/1972 | Atakkaan | H01H 13/02 200/16 A |
| 3,867,599 | A | * | 2/1975 | Moen | H01H 15/06 200/16 A |
| 4,421,959 | A | * | 12/1983 | Chen | H01H 9/38 200/16 A |
| 4,540,859 | A | * | 9/1985 | Lemmer | H01H 11/0012 200/16 A |

(Continued)

*Primary Examiner* — Brian M O'Hara
*Assistant Examiner* — Michael B Kreiner
(74) *Attorney, Agent, or Firm* — Kilpatrick Townsend & Stockton LLP

(57) ABSTRACT

A switch for switching power to a load of a vehicle may be described. In an example, the switch may include a number of members configured to move between switch positions in a predefined order such that a load and a power source are electrically coupled or electrically decoupled via the switch based on the predefined order. In particular, a first member may be configured to move to a first switch position and form a first electrically conductive path having a first electrical property. A second member may be configured to move to a second switch position and form a second electrically conductive path having a second electrical property different from the first electrical property. A third member may be configured to move the second member based on movement of the first member to the first switch position such that movement of the second member to the second switch position may occur based on the movement of the first member to the first switch position.

18 Claims, 10 Drawing Sheets

(56) References Cited

U.S. PATENT DOCUMENTS

| | | | | | |
|---|---|---|---|---|---|
| 4,616,117 | A | * | 10/1986 | Kleine | H01H 3/001 200/243 |
| 4,924,040 | A | * | 5/1990 | Orrico | H01H 1/20 200/16 A |
| 5,260,531 | A | * | 11/1993 | Yarbrough | H01H 1/20 200/16 A |
| 6,774,509 | B2 | * | 8/2004 | Chu | H01C 10/12 174/257 |
| 8,212,170 | B2 | * | 7/2012 | Horikoshi | H01H 13/52 200/243 |
| 9,592,744 | B2 | * | 3/2017 | Zhao | B60L 11/1861 |

* cited by examiner

ELECTRICAL SWITCH FOR A LOAD IN A VEHICLE

BACKGROUND

Vehicles may generally be designed for different missions. Configurations of the vehicles may depend on such missions. An unmanned aerial vehicle (UAV) is an example of a vehicle. The UAV may be configured to perform some tasks autonomously. For instance, the UAV may autonomously fly between a source and a destination. The UAV may also be configured to provide various services. For instance, the UAV may deliver items from the source to the destination.

A vehicle's power system may depend on the vehicle's configuration and/or mission. The power system may include a set of power sources, loads, and electrical switches. Generally, the more complex the mission, the more complex the configuration may become. In turn, the more complex the configuration, the more complex the power system may become. For instance, a complex power system may include a relatively large number of power loads, each of which is configured for a specific function of the mission. The success of the mission and/or reliability of the vehicle may depend on properly switching the power to the power loads.

BRIEF DESCRIPTION OF THE DRAWINGS

Various embodiments in accordance with the present disclosure will be described with reference to the drawings, in which.

DETAILED DESCRIPTION

Figure 1:
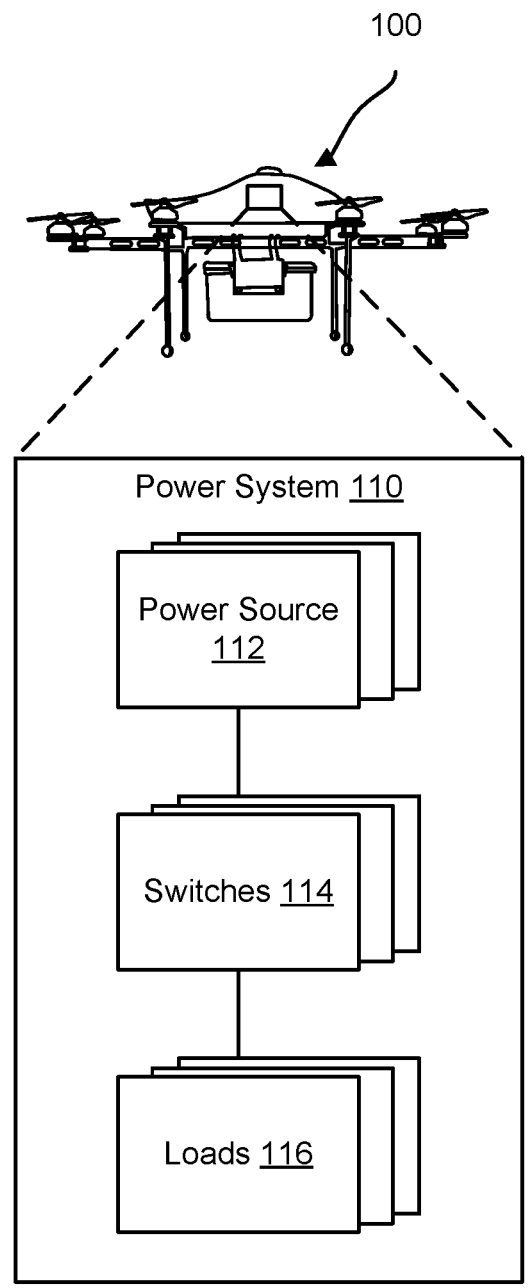
FIG. 1 illustrates an example power system of a vehicle, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a switch that may be implemented as a part of a power system. The switch may be configured for an on and off switch such that one or more power sources and one or more loads may be electrically coupled and decoupled. In an example, the power system may belong to a vehicle. A power source may be internal or external to the vehicle. In comparison, a load may generally be internal to the vehicle. More particularly, the switch may be configured to turn on and/or off power to a load in multiple stages. Each stage may correspond to a particular electrical path between the load and the power source, where that path may have desired electrical properties (e.g., resistivity, conductivity, inductivity, etc.). The switch may be configured such that moving between the stages (e.g., switching on and/or off power to the load by going through the different stages) may follow a predefined order. In other words, to move from stage "K−1" to stage "K+1," going through stage "K" may be necessary. As such, switching on and/or off the power may follow a predefined order of electrical paths, each of which may have particular electrical properties. The order, or equivalently, the electrical paths and corresponding electrical properties may be predefined or designed based on, for example, the power characteristics of the power source and/or the load. In an example, the switch may mechanically enforce the predefined order. In other words, moving from stage "K−1" to stage "K+1" may not be mechanically possible unless stage "K" is switched to after stage "K−1" and prior to stage "K+1." In addition, a single key (or other mechanism) may be used to activate the switch and move between the different stages. For example, the key may be inserted in the switch and moved along a certain direction to switch on and/or off the power according to the different stages.

To illustrate, consider an example of turning power on to a propulsion system of a UAV from a direct current (DC) battery of the UAV. Depending on the power characteristics of the propulsion system and the DC battery, using a single stage on/off switch may lead to an in-rush current and/or a spark when the power is first switched on. In comparison, using a dual stage switch may suppress the in-rush current and the spark. More particularly, a first stage of the switch may correspond to a high resistive electrical path in the range of ten ohms (10Ω) to ten kilo ohms (10 kΩ). A second stage of the switch may correspond to a low resistive electrical path of less than a few ohms. Switching on the power may be mechanically enforced such that the high resistive electrical path initially connects the DC battery and the propulsion system and, subsequently, the low resistive electrical path connects the two components. A remove-before-flight key may be used for moving between the stages. The key may be inserted and rotated (or some other motion may be used) to move the switch to the first stage, thereby electrically coupling the DC battery and the propulsion system through the high resistive electrical path. As the rotation of the key continues, the switch may move to the second stage while the high resistive electrical path is maintained, thereby additionally electrically coupling the DC battery and the propulsion system through the low resistive electrical path. This high-resistive first and low-resistive second order of electrical coupling may suppress the in-rush current and potential sparking. After that point, the key may be removed from the switch providing a visual indication that the UAV is ready for flight. However, the low resistive electrical path may be mechanically maintained to ensure that power is supplied to the propulsion system for the flight. In comparison, the high resistive electrical path may, but need not, be mechanically maintained.

In the interest of clarity of explanation, the embodiments of the present disclosure may be described in the context of a multi-stage switch of a UAV. However, the embodiments are not limited as such. Instead, the embodiments may similarly apply to any vehicle, whether unmanned or not and whether aerial or not. In particular, the multi-stage switch may be a part of a power system of a vehicle and may be used to switch on and/or off power to one or more loads from one or more power sources.

Turning to FIG. 1, the figure illustrates an example UAV 100 that includes a power system 110. The UAV 100 may be configured for different missions including, for instance, delivery of items. A detailed example configuration of the UAV 100 is further illustrated in FIG. 6. The configuration of the power system 110 may depend on the configuration and/or mission of the UAV 100. Generally, the power system 110 may include a set of power sources 112, switches 114, and loads 116. Power may be supplied from the power sources 112 to the loads 116. The switches 114 may be configured to switch on and/off the power to specific loads 116 based on, for instance, phases of the mission. The phases may include on-the-ground, preparing for flight, take-off, flight, delivery of an item, landing, refueling, preparing for entering into an off state, and/or other mission-related phases.

Each one of the loads 116 may be designed to provide a function of the UAV 100 as part of the mission. In an example, the loads 116 may include an avionics system, a propulsion system, an item delivery system, a sense and avoid system, and/or other mission-related loads. Although in this example, a system is illustrated as a load, a single component of a system may also be a load. For instance, a management computer of the avionics system may represent a load.

Each one of the power sources 112 may be designed to provide power to a set of the loads 116. The provided power may depend on the respective loads 116. In an example, the power sources 112 may include a set of DC batteries. A DC battery may supply a current in the range of one to three hundred amperes at a voltage in the range of thirteen to one hundred volts. The voltage range may be divided into sub-ranges. Each sub-range may correspond to a power source type and/or a load type. The sub-ranges may include thirteen volts to thirty-six volts, thirty-six volts to sixty-five volts, and sixty-five volts to one hundred volts. Although the power sources 112 are illustrated as being internal to the UAV 100, some of the power sources 112 may be external. For instance, while the UAV 100 is on the ground, a ground power source external to the UAV 100 may be electrically coupled to the power system 110 and supply power to some or all of the loads 116 through the respective switches 114.

Each of the switches 114 may be configured to electrically couple and decouple one or more of the loads 116 to one or more of the power sources 112. In other words, one of the switches 114 may be used to selectively switch on and/or off power to a respective load of the loads 116 from a respective power source of the power sources 112. The on and/or off switching through a switch may be manual and may necessitate the operation of a mechanism, such as the insertion or removal of a key into the switch.

In an example, each or some of the switches 114 may be a multi-stage switch. Detailed examples of the multi-stage switch are further illustrated in FIGS. 2-5. Briefly, the multi-stage switch may be configured to switch on and/or off power in multiple stages according to a predefined order. Each of the stages may correspond to an electrical conductive path having particular electrical properties. The predefined order may be mechanically enforced. As such, switching from one stage to the next (e.g., electrically coupling or decoupling an additional or alternative electrical conductive path) may be possible when the predefined order is followed. In addition, the multi-stage switch may use a single key (or some other mechanism such as a button) to switch between the multiple stages.

Generally, a multi-stage switch used for one load may be different from the one used for another load. Similarly, a multi-stage switch used for one power source may be different from the one used for another power source. To illustrate, consider a first multi-stage switch used for an avionics load and a second multi-stage switch used for a propulsion load. In an example, the two switches may use a different number of stages. In another example, the two switches may use the same number of stages. However, the electrical properties of the respective stages may be different. For instance, the two switches may provide electrically conductive paths with different electrical resistivity for the same stage. The number of stages and the electrical properties of the respective electrically conductive paths may depend on power characteristics of a power source and/or a load that should be electrically coupled and/or electrically decoupled.

In addition and for a same multi-stage switch, the number of stages to switch on power may be the same or different from the number of stages to switch off the power. In an example, the number may be the same, but the stages may be sequenced in opposing orders. For instance, if stages "A," "B," and "C" are sequentially followed to switch on the power, stages "C," "B," and "A" may be sequentially followed to switch off the power. In another example, the number may be the same but the order may be different. For instance, if stages "A," "B," and "C" are sequentially followed to switch on the power, stages "C," "A," and "B" may be sequentially followed to switch off the power. In yet another example, the stages may be different. For instance, if three stages are used to switch on the power, one or two stages may be used to switch off the power.

Figure 2:
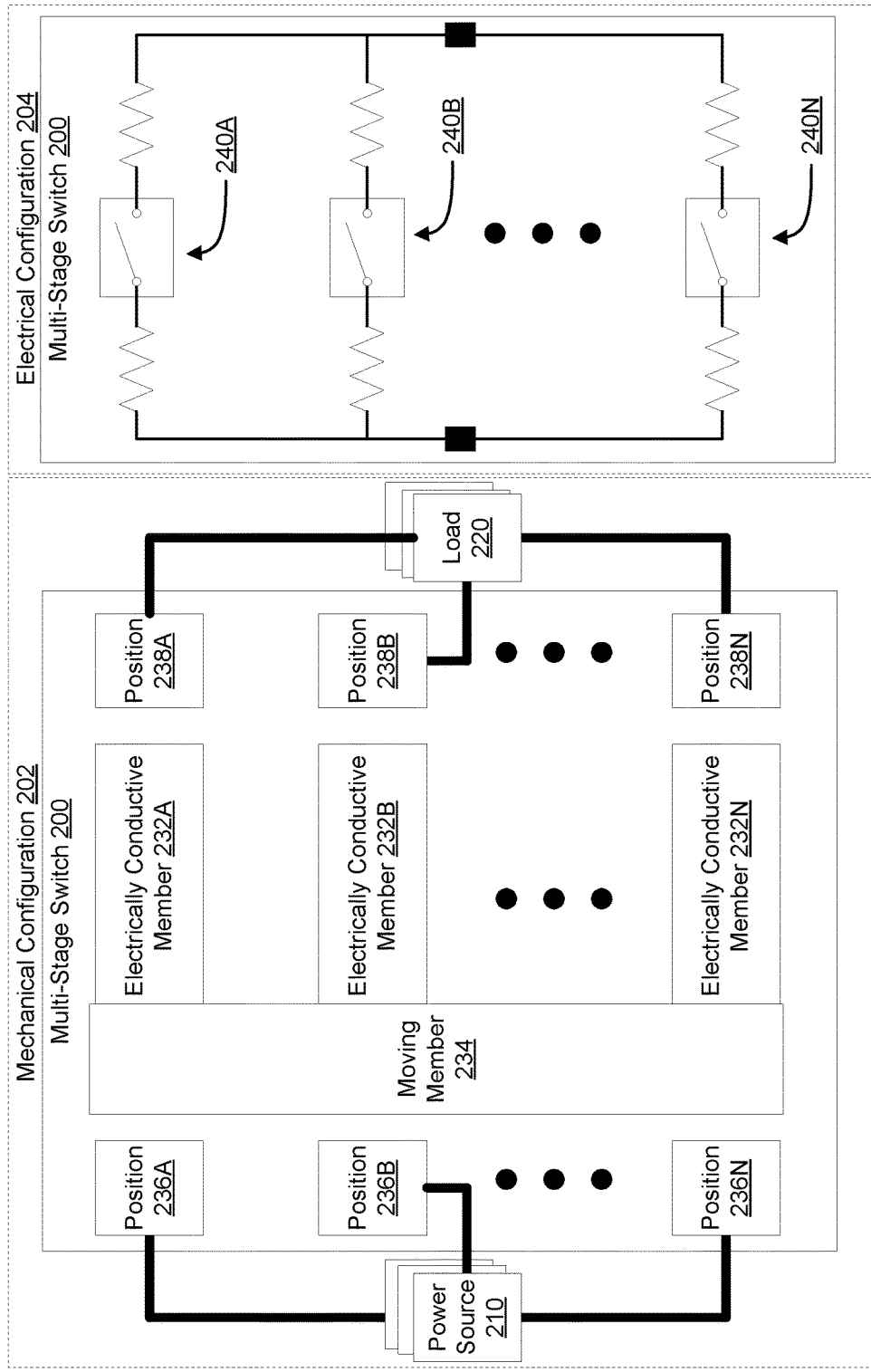
FIG. 2 illustrates an example switch of a power system.

FIG. 2 illustrates an example of a multi-stage switch 200 that may implement "N" stages (where "N" is an integer equal to or greater than two). Each of the stages may correspond to an electrically conductive path having electrical properties. These properties may be determined by a designer or an integrator of the multi-switch in a power system based on power characteristics of the power system (e.g., respective power source 210 and/or load 220). An electrically conductive path may be designed to meet the respective electrical properties. The design may involve a mechanical configuration 202 and an electrical configuration 204 of the multi-stage switch 200. The multi-stage switch 200 may be used to mechanically and electrically couple one or more power sources to one or more loads. In the interest of clarity of explanation, the coupling of a single power source 210 and a single load 220 is described. However, this coupling may be similarly extended to a larger number of power sources and/or loads.

The mechanical configuration 202 may represent a configuration of components of the multi-stage switch 200 to achieve desired mechanical properties. The mechanical properties may include the capability of creating and breaking a continuous path. A continuous path may be a path between the power source 210 and the load 220 through which an electrical current may flow. A "switch on" may include creating the continuous path by mechanically coupling (e.g., by establishing a physical connection) one or more previously mechanically decoupled ends of the continuous path. A "switch off" may include breaking the continuous path by mechanically decoupling the one or more ends of the continuous path. The mechanical properties may also include the capability of enforcing a predefined order for creating and/or breaking continuous paths.

As far as creating and breaking a continuous path, the multi-stage switch 200 may include a set of members configured for that purpose. An example member may include an electrically conductive member, such as a contact plate, a contact bar, or some other structure made of an electrically conductive material such as a highly conductive metal (high electrical conductor) or ceramic (low electrical conductor). To create a continuous path, the electrically conductive member may be mechanically coupled to one or more previously mechanically decoupled ends of the continuous path. An end may correspond to a switch position. By establishing a physical connection with that end at that switch position, the electrically conductive member and the end may be mechanically coupled. Conversely, to break the continuous path, the electrically conductive member may be mechanically decoupled from the end. For instance, the electrically conductive member may be moved to break the physical connection with the end at the respective switch position.

As illustrated in FIG. 2, "N" electrically conductive members 232A-N may be used to create (and break) "N" continuous paths. Each path may correspond to a stage of the "N" stages of the multi-stage switch. As further illustrated in FIG. 2, a continuous path may have two ends. Each end may correspond to a switch position. Thus, for the "N" continuous paths, there are two sets of "N" switch positions: switch positions 236A-N corresponding to the ends that are coupled to the power source 210 and switch positions 238A-N corresponding to the ends that are coupled to the load 220. A continuous path "A" may be created by mechanically coupling the electrically conductive member 232A to the ends at the switch positions 236A and 238A. The continuous path "A" may be broken by mechanically decoupling the electrically conductive member 232A from either or both ends at the switch positions 236A and 238A. Similar configurations may be used to create continuous paths "B" through "N" based on the electrically conductive members 232B-N, switch positions 236B-N, and switch positions 238B-N.

To enforce a predefined order for creating and/or breaking a continuous path, the multi-stage switch 200 may include a set of moving members. An example moving member may include any number or a combination of a plunger, spring, an elastomer component, an arm, threads, a button, and/or other mechanical member that may be used for mechanical movement. The moving member may be configured such that a continuous path corresponding to a stage "K" of the "N" stages is created only if the previous continuous path of stage "K−1" has already been created. The moving member may also be configured, conversely, such that the continuous path of stage "K" is broken only if the continuous path of the next stage "K+1" has already been broken.

As illustrated in FIG. 2, a moving member 234 may be used to enforce the predefined order associated with the multi-stage switch 200. The illustrated order may be sequentially ascending (e.g., "A, B, . . . N"). As such, to create the different continuous paths "A" through "N," the electrically conductive member 232A should be switched on to switch positions 236A and 238A first, followed by the electrically conductive member 232B switched on to switch positions 236B and 238B, and so on and so forth. To break the different continuous paths "N" through "A," the electrically conductive member 232N should be switched off from switch positions 236N and/or 238N first, followed by the electrically conductive member 232 "N−1" switched off from switch positions 236 "N−1" and/or 238 "N−1," and so on and so forth.

The moving member 234 may be configured such that the electrically conductive member 232B may be switched on only if the electrically conductive member 232A has been switched on, and so on and so forth. The moving member 234 may also be configured such that the electrically conductive member 232B may be switched off only if the electrically conductive member of the next stage "C" has been switched off.

In a further example, to create a continuous path at stage "K," the moving member 234 may be configured to ensure that all of the continuous paths at stages "A" through "K−1" have been created and are maintained. In another example, this cumulative creation of continuous paths at previous stages may not be implemented. Instead, to create the continuous path at stage "K," the moving member 234 may be configured to ensure that only the continuous path at stage "K−1" has been created and to, optionally or additionally, break the continuous path at stage "K−1" (or at other previous stages selectively chosen by design) once the continuous path at stage "K" is created. Similar configurations of the moving member 234 may be used to cumulatively or selectively break the continuous paths "N" through "A."

In comparison to the mechanical configuration 202, the electrical configuration 204 may represent a configuration of electrical components of the multi-stage switch 200 to achieve desired electrical properties. The electrical properties may be based on power characteristics of the power source 210 and/or load 220). Examples of electrical properties may include resistivity, conductivity, inductivity, etc. Various electrical components may be used based on the electrical properties including electrical resistors, conductors, capacitors, inductors, etc. In an example, some or all of these components may be integrated with the electrically conductive members, moving members, and/or switch positions of the mechanical configuration 202. For instance, to achieve a desired electrical resistivity, an electrically conductive member may be coated with a resistive material or may be made of a particular conductive material that would result in the desired electrical resistivity. In another example, no integration may be used (e.g., the electrical components may supplement the mechanical components). For instance, to achieve a desired electrical resistivity, an appropriate electrical resistor may be added to an end of a continuous path (at or near the respective switch position).

FIG. 2 illustrates an example of electrical resistors for the electrical configuration 204. As illustrated, each of the stages "N" of the multi-stage switch 200 may have a particular electrical resistivity. As such and at each stage, an appropriate set of electrical resistors may be added to the respective continuous path. In an example, the addition may integrate the electrical resistors with the component of the mechanical configuration 202. In another example, the addition may add the electrical resistors as additional components that are separate from the ones of the mechanical configuration 202.

As illustrated, a set of two resistors 240A may be used for stage "A." Similarly, two sets of resistors may be used for each of the remaining stages. For instance, two sets of two resistors each 240B and 240N may be used for the stages "B" and "N," respectively. Although each stage is illustrated as having two resistors, the number of resistors per stage may vary. For example, rather than using two resistors, one resistor may be used at stage "B." In another example, to achieve low resistivity at stage "N," no resistor may be used at that stage. Instead, a high conductive electrical connection may be used at stage "N." Further, the resistivity of the resistors may vary. For instance, the set of resistors 240A may have high resistivity in the range of ten ohms (10Ω) to ten kilo ohms (10 kΩ). In comparison, the set of resistors 240N may have low resistivity in the range of a few ohms, if any.

Although the electrical configuration 204 is illustrated with examples of electrical resistors, other electrical components may also be used. For example, each stage may include one or a combination of electrical resistors, conductors, capacitors, inductors, etc. The number and type of electrical components to use at each stage may depend on the electrical property to be achieved at that stage.

Hence, by setting up the mechanical configuration 202 and the electrical configuration 204, a highly configurable multi-stage switch 200 may be implemented. On one hand, the mechanical configuration 202 may define a number of stages and enforce an order for moving between the stages. On the other hand, the electrical configuration 204 may achieve specific electrical properties at each stage.

Turning to FIGS. 3A-C, 4A-B, and 5, the figures illustrate various examples of a dual stage switch. The illustrated switch may be integrated or installed within a power system of a UAV. For example, the dual state switch may be used to switch on and/or off power from a DC battery of the UAV to a propulsion load of the UAV. In the switch on mode, the first stage may correspond to an electrically conductive path with high electrical resistivity. The second stage may correspond to an electrically conductive path with low electrical resistivity. This may suppress an in-rush current and a spark upon switching on the power to the propulsion load. In the switch off mode, the reverse order may be used. Although the switch is illustrated as being dual stage, a larger number of stages may also be used. Further, although example electrical properties of high and low electrical resistivity are used, other electrical properties may be designed for and implemented at each stage.

Figure 3A:
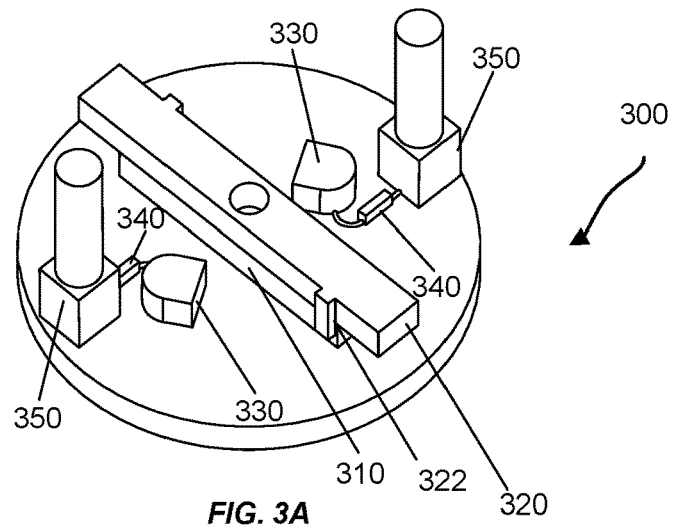
FIGS. 3A, 3B, and 3C illustrate an example switch implementing a rotational actuation, according to embodiments.
Figure 3B:
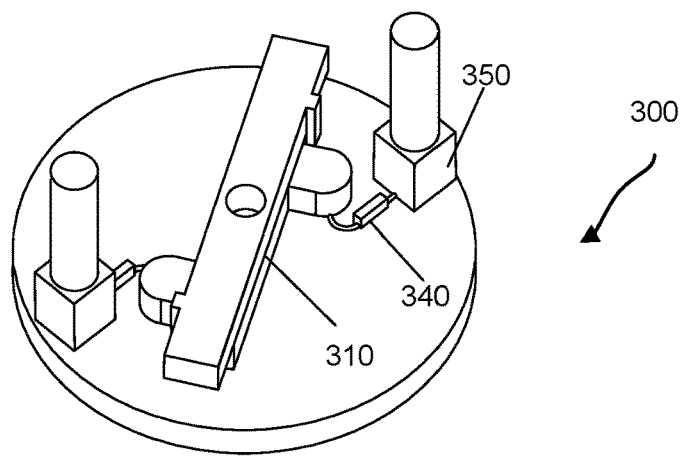
Figure 3C:
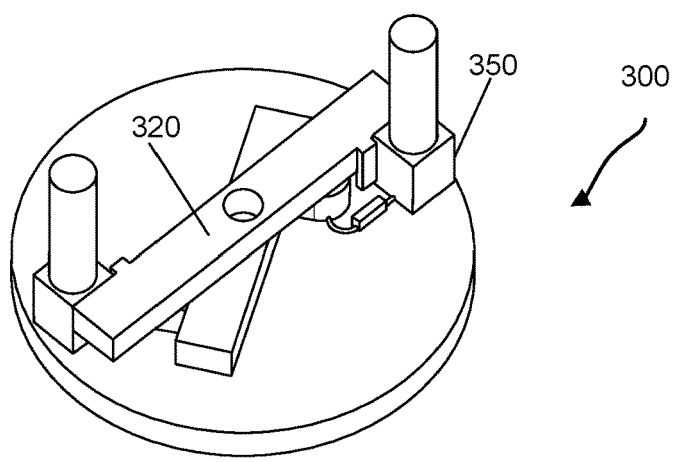
Figure 4A:
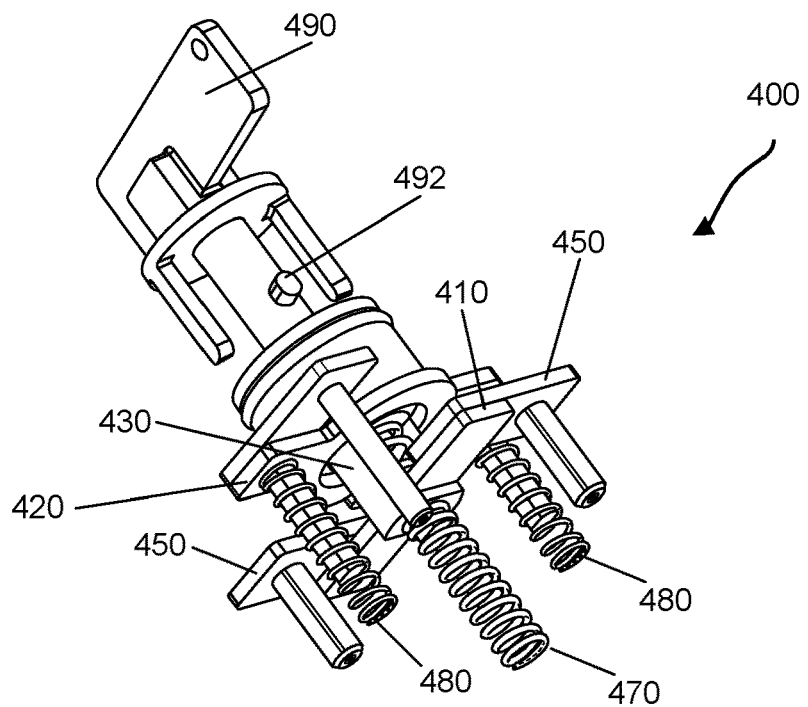
FIGS. 4A, 4B, 4C, and 4D illustrate an example switch implementing a uniaxial translating actuation, according to embodiments.
Figure 4B:
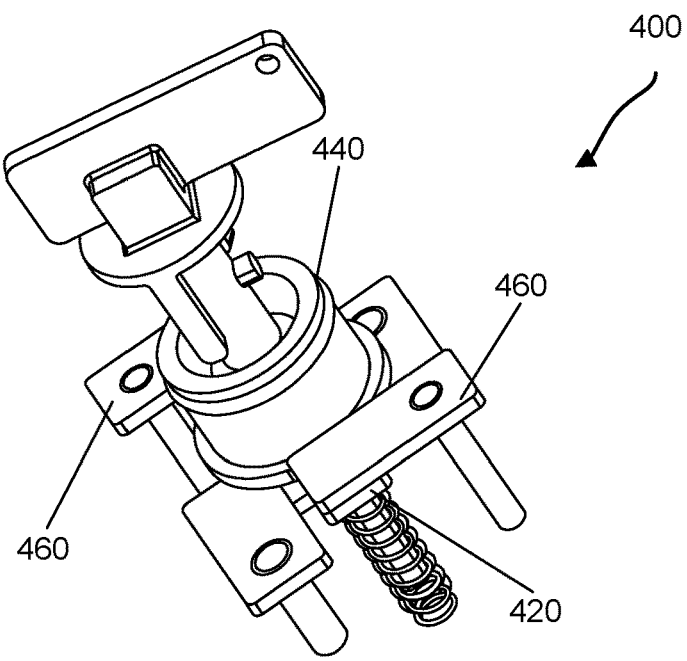
Figure 4C:
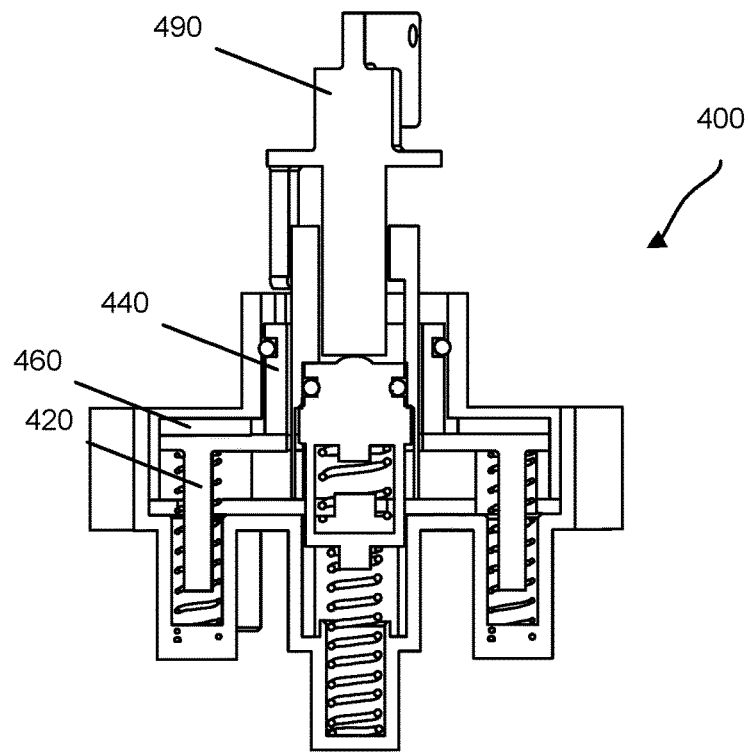
Figure 4D:
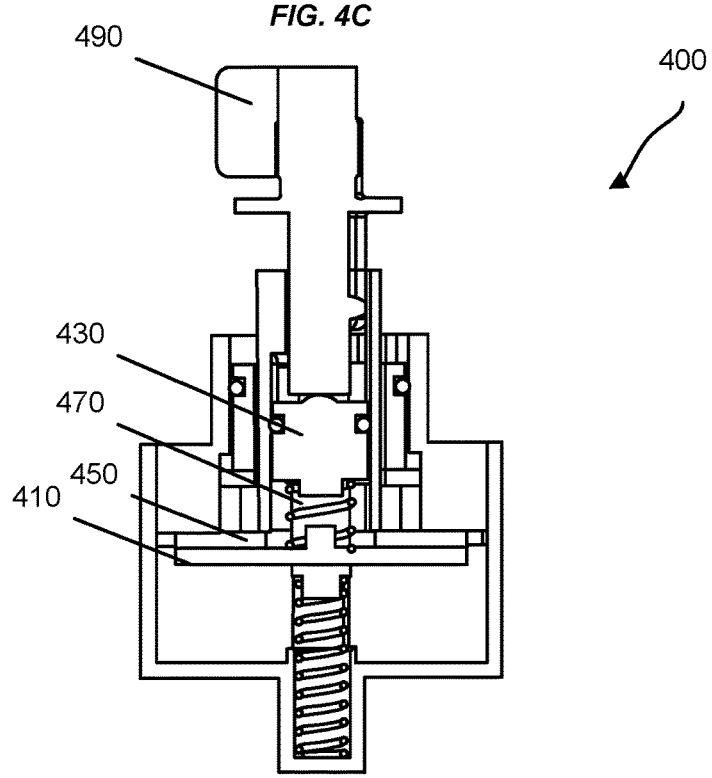
Figure 5A:
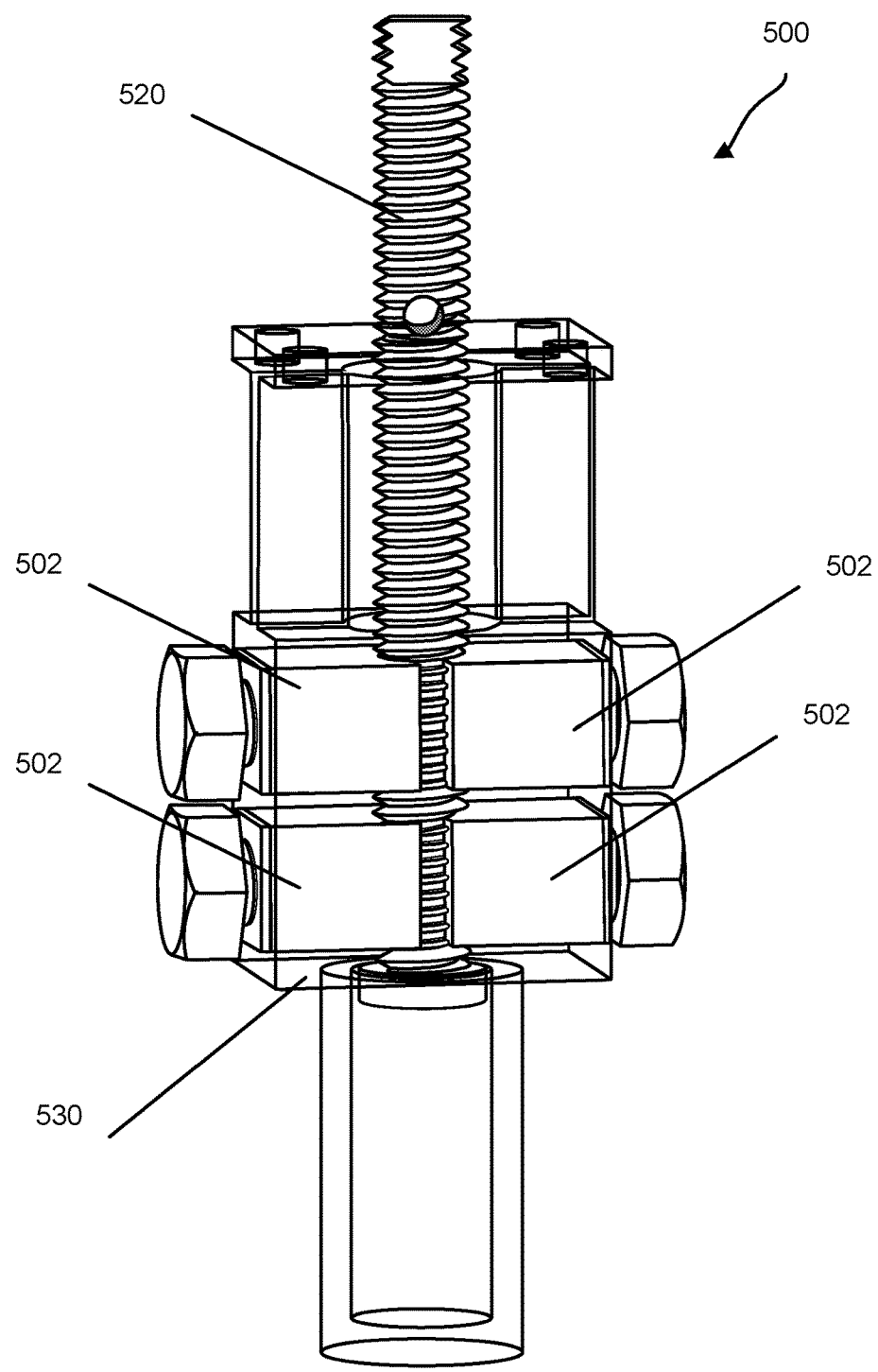
FIGS. 5A, 5B, 5C and 5D illustrate an example of a switch implementing a threaded housing, according to embodiments.
Figure 5B:
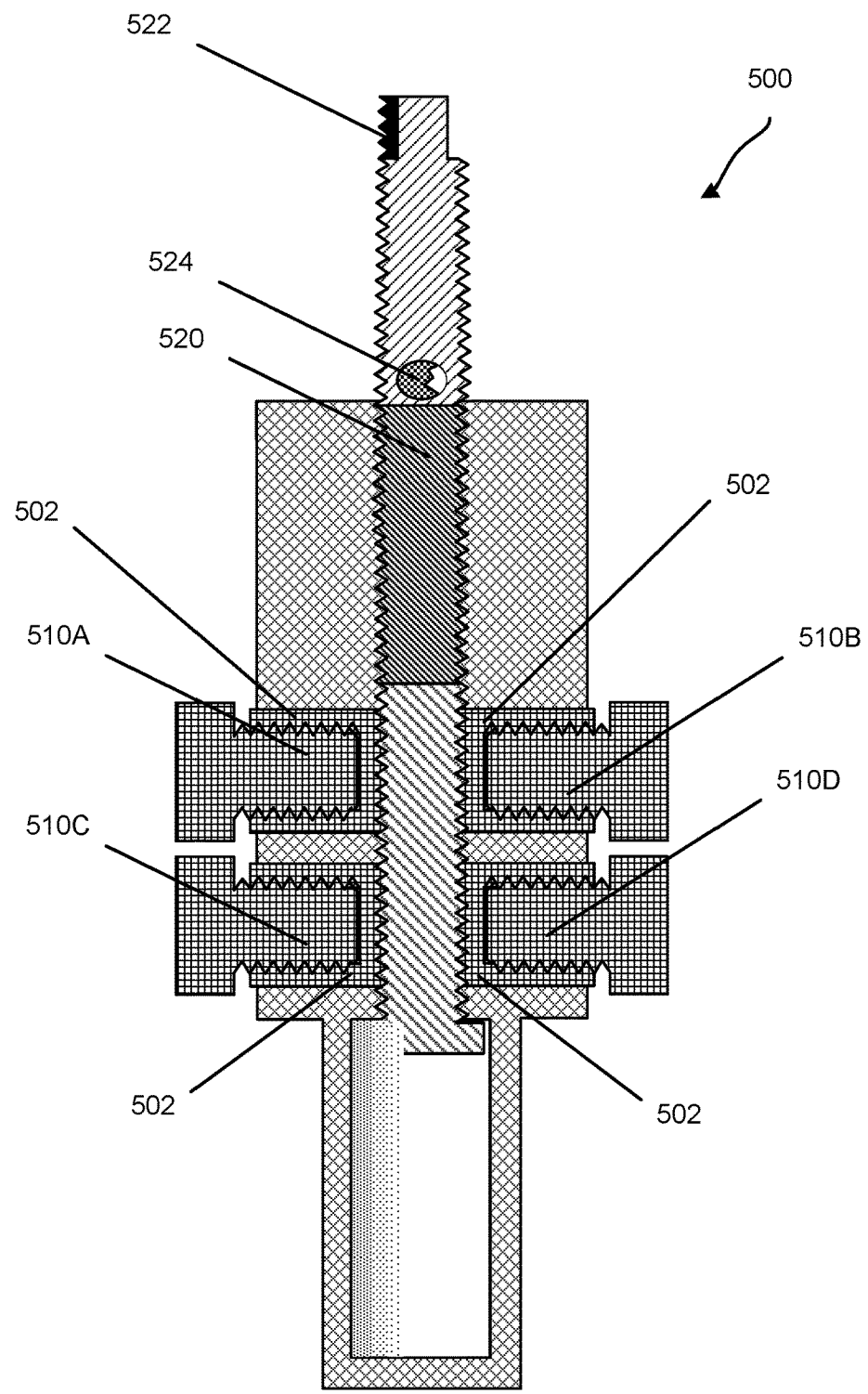
Figure 5C:
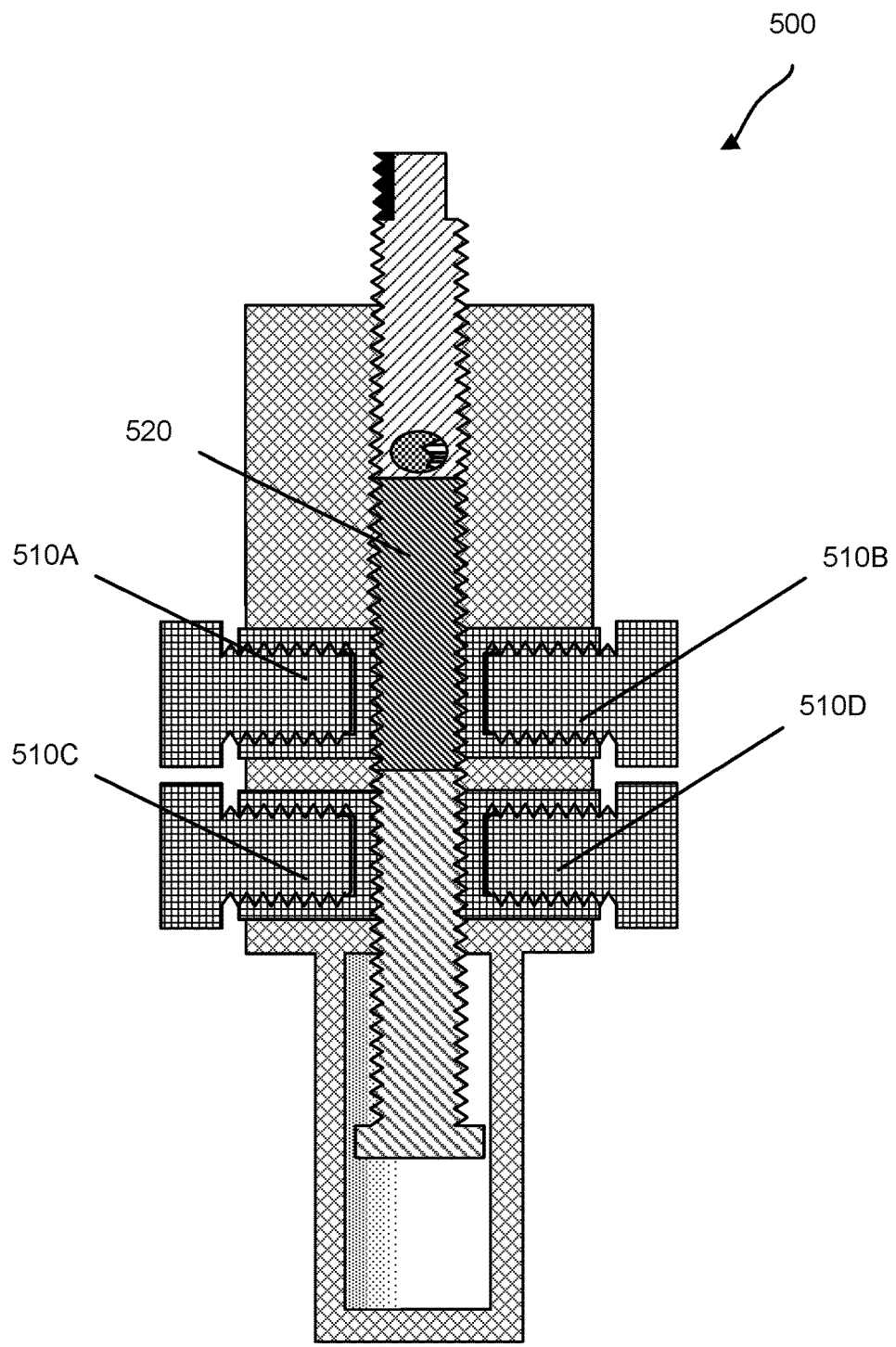
Figure 5D:
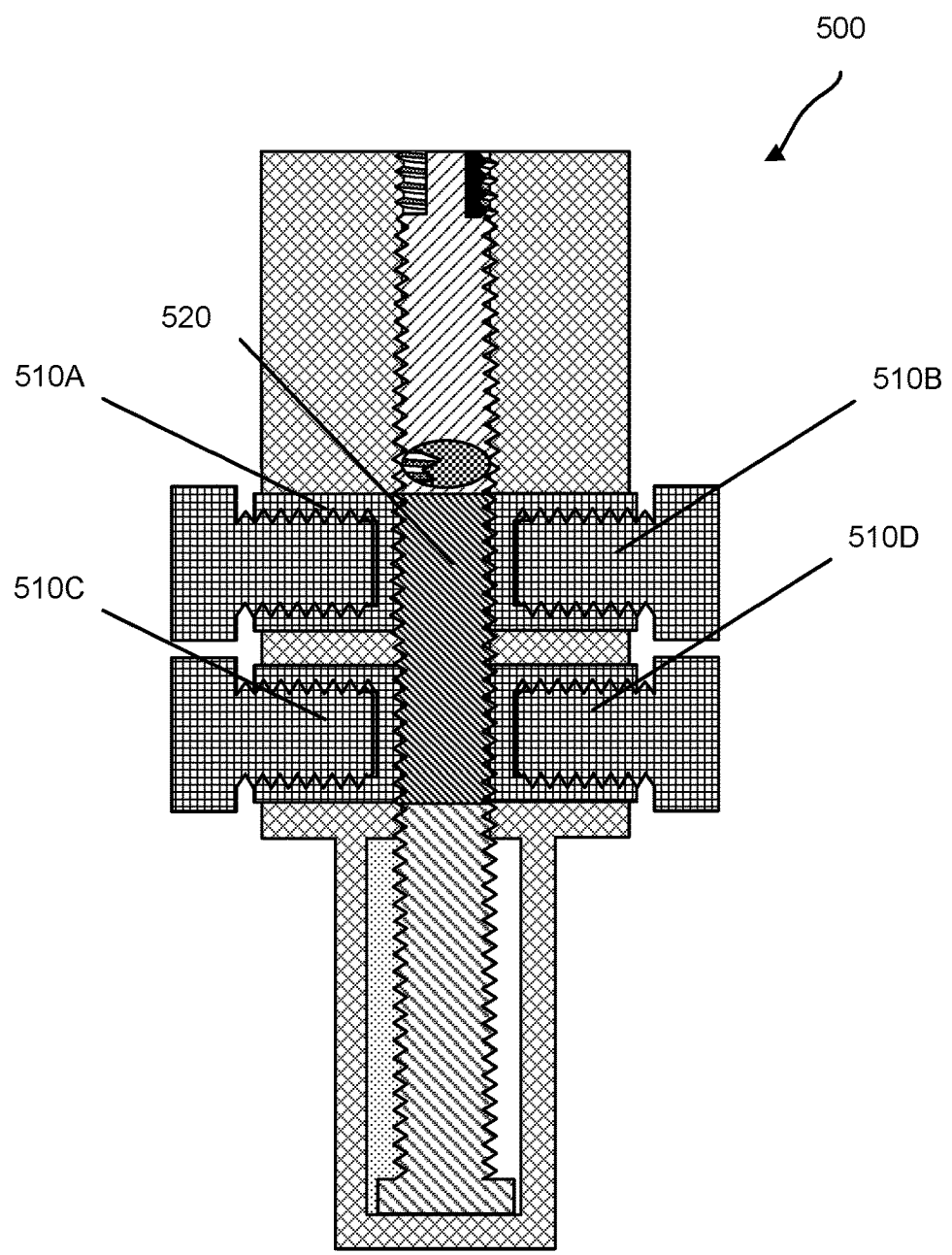

FIGS. 3A-3C illustrate a rotational actuation that uses a removable key. In comparison, FIGS. 4A-D illustrate a translational actuation that also uses a removable key. Although each of these figures illustrates one type of actuation, the embodiments are not limited as such. Instead, different types of actuations may be used in a single switch. For example, in the first stage, the key may be rotationally actuated. In the second stage, the key may be translationally actuated. In addition, the embodiments are not limited to a removable key. For example, and as illustrated in FIG. 5 a key may be inserted in at least one embodiment.

Further, although FIGS. 3A-C, 4A-B, and 5 illustrate the use of a key for the switching, the embodiments are not limited as such. Other mechanisms, such as a button, may be used in lieu of or in addition to a key. For example, a button may be pushed and held at the first stage of the switching. At the second stage, the button may be rotated. In this example, the moving member 234 may be configured such that the button needs to be pushed and held first before being rotated. For instance, the moving member 234 may include a housing, arms of the housing, and springs attached to the housing to enforce this predefined order.

FIGS. 3A, 3B, and 3C illustrate an example dual stage switch 300 implementing a rotational actuation. Generally, the dual stage switch 300 may implement a uniaxial rotating torsion spring loaded mechanism. This mechanism may interface with a key for actuation and may include a lower bar 310, an upper bar 320, inner studs 330, resistors 340, and outer studs 350. One or more torsion springs (not shown in the figures in the interest of clarity of explanation) may be used. The center of torsion spring(s) may be mechanically connected or attached to the dual stage switch 300. Ends of the torsion spring(s) may be mechanically connected or attached to the lower bar 310 and/or the upper bar 320.

The lower bar 310, upper bar 320, inner studs 330, and outer studs 350 may be made of highly conductive electrical material, such as a highly conductive metal (e.g., copper, silver, or gold). Each of the resistors 340 may electrically couple a pair of one inner stud and one outer stud. In addition, each of the resistors 340 may have a high electrical resistivity value in the range of ten ohms (10Ω) to ten kilo ohms (10 kΩ). One of the outer studs 350 may be electrically coupled to the UAV's propulsion load. Similarly, the other outer studs 350 may be electrically coupled to the UAV's DC battery.

In comparison to the components of FIG. 2, the lower bar 310 and upper bar 320 may represent electrically conductive members. The torsion spring and an arm 322 of the upper bar may represent moving members. The inner studs 330 and outer studs 350 may correspond to ends at respective switch positions.

In an example, the key may be inserted in the center of the dual stage switch 300 such as to interface with a hole traversing the lower bar 310 and the upper bar 320. In another example, the outer contact bar may be elongated to protrude out of the base of the dual stage switch. The protruding portion may be coated or surrounded with a material acting as an electrical insulator, such as a thermoplastic or elastomeric material. The key may interface with the protruding portion.

In both examples, the key may be releasable. For instance, when the dual stage switch 300 is completely switched on (e.g., the last stage is completed for the switch on mode as illustrated in FIG. 3A), the key may be released. The torsion spring may hold the upper bar 320, and optionally the lower bar 310, in place to maintain the "switch on" mode. To move to the "switch off" mode, the key may be inserted and rotated, breaking the contacts between the outer contact bar 320 and lower bar 310 with the outer studs 350 and inner studs 310 (as illustrated in FIG. 3A). The rotation may build tension in the spring. In the off position, the key may be latched to a component (e.g., a hook or a nub) of the dual stage switch 300 and/or of the structure of the UAV where the dual stage switch 300 may be installed.

In a "switch on" operation, the lower bar 310 and upper bar 320 may be in an initial disengaged position where no electrically conductive path may exist (e.g., no contacts with the inner studs 330 and outer studs 350). In a first stage, the key may be rotated (e.g., clockwise along a plane) releasing torsion in the spring(s), thereby rotating the upper bar 320 and the lower bar 310.

As illustrated in FIG. 3B, the rotation causes the lower bar 310 to contact the inner studs 330 in the first stage. This contact may electrically couple the two outer studs 350 forming an electrically conductive path that includes the outer studs 350, resistors 340, inner studs 330, and the lower bar 310. While the outer studs 350, inner studs 330, and lower bar 310 may be high electrical conductors, the resistors 340 may provide the desired electrical resistivity for the first stage in the "switch on" mode.

In a second stage, the key may be further rotated along the same direction and plane (e.g., clockwise along the plane). Accordingly, the torsion in the spring may also be released, thereby further rotating the upper bar 320. The lower bar 310 may be maintained in position because of the contact with the inner studs 330.

As illustrated in FIG. 3C, the rotation causes the upper bar 320 to contact the outer studs 350 in the second stage. This contact may electrically couple the two outer studs 350 forming a second electrically conductive path that includes the outer studs 350 and upper bar 320. Because the outer studs 350 and upper bar 320 may be high electrical conductors, the second electrically conductive path may have a low electrical resistivity.

Once the rotation is complete (e.g., the upper bar 320 is in contact with the outer studs 350 and the second stage is complete), the key may be released from the dual stage switch 300. Remaining tension in the torsion spring(s) may hold the upper bar 320 and, optionally, the lower bar 310 in place until the key is reinserted and rotated to follow the "switch off" mode.

The "switch off" mode may follow the reverse order (e.g., starting with the configuration of FIG. 3C to end with the configuration of FIG. 3A). For example, the key may be inserted and rotated in the opposite direction (e.g., counter clockwise in the plane). The rotation may build tension in the torsion spring(s) and may break, in the second stage, the contact between the upper bar 320 and the outer studs 350. This may break the second electrically conductive path (e.g., the low resistivity path). The upper bar 320 may also contain upper arms 322. As the rotation continues, the arms 322 may contact the lower bar 310. This may cause the rotation of both the upper bar 320 and the lower bar 310, thereby breaking contact with the inner studs 330 and the first electrically conductive path (e.g., the high resistivity path). The two bars 310 and 320 may be locked into position with the electrically conductive paths broken by, for example, locking the key to the dual master switch 300 or to a structure of the UAV.

FIGS. 4A, 4B, 4C, and 4D similarly illustrate an example of a dual stage switch 400. In this example, the dual stage switch 400 may implement a uniaxial translating compression spring loaded mechanism. This mechanism may interface with a key for translational actuation (rather than rotational actuation as illustrated in FIGS. 3A-C). The actuation may move a lower plate 410 and an upper plate 420 along a same axis (e.g., a vertical axis). In addition to the two plates 410 and 420, the dual stage switch 400 may include a lower plunger 430, an upper plunger 440, lower bars 450, upper bars 460, a lower spring 470, and upper springs 480. The dual stage switch 400 may interface with a key 490 for switching on and/or off power. The key 490 may be released once the power is switched on. Conversely, the key 490 may be locked in position once the power is switched off.

The lower plate 410, upper plate 420, lower bars 450, and upper bars 460 may be made of highly conductive electrical material, such as a highly conductive metal. In comparison, the lower plunger 430, upper plunger 440, lower spring 470, upper springs 480, and the key 490 may be made of or coated with an electrical insulator.

In an example, one of the upper bars 460 (or, alternatively, one of the lower bars 450) may be electrically coupled to the UAV's propulsion system. The other upper bar 460 (or, alternatively, the other lower bar 450) may be electrically coupled to the UAV's DC battery. An electrical resistor may electrically couple a pair of one upper bar and one lower bar. Another electrical resistor may similarly couple the remaining upper bar and lower bar pair. Each of the electrical resistors may have a high electrical resistivity value in the range of ten ohms (10Ω) to ten kilo ohms (10 kΩ). In another example, electrical resistors may not be used. Instead, a high conductive material may be used, such as a highly conductive metal contact plate or wire. In this case, the resistivity may be built into the lower plate 450. For instance, the lower plate 450 may be coated with or made of a proper electrically resistivity to achieve the desired electrical resistivity.

In comparison to the components of FIG. 2, the lower plate 410 and upper plate 420 may represent electrically conductive members. The plungers 430 and 440, bars 450 and 460, and springs 470 and 480 may represent moving members. The bars 450 and 460 may correspond to ends at respective switch positions.

FIGS. 4A, 4B, 4C, and 4D illustrate the dual stage switch 400 in a "switch on" position where power may be flowing through the dual stage switch 400 to the propulsion. Two electrically conductive paths may exist. The first electrically conductive path may be formed by the lower plate 410 and the lower bars 450, the upper plate 420 and upper bars 460, and any applicable electrical resistors. This first electrically conductive path may have high electrical resistivity. The second electrically conductive path may be formed by the upper plate 410 and the upper bard 460. This second electrically conductive path may have low electrical resistivity. Switching off the power may follow two stages. The first stage may correspond to using the lower plunger 430 to break the first electrically conductive path. The second stage may correspond to using the upper plunger 440 to break the second electrically conductive path. Switching on the power may follow similar stages. Initially, the first electrically conductive path may be created by using the lower plunger 430. Subsequently, the second electrically conductive path may be created by using the upper plunger 440.

In an example of the "switch off" mode, the key 490 may be inserted in the dual stage switch 400 and translated downward (or some other translational direction) as part of the first stage. As the key 490 is inserted in the dual stage switch 400, the middle of the key 490 may contact the lower plunger 430. This may allow translational actuation of the lower plunger 430 by moving the key 490 downward. The movement may compress the lower spring 470 attached to the lower end of the lower plunger 410. This may break the contact between the lower plate 410 and the lower bars 450, thereby breaking the first electrically conductive path (the high resistivity path).

In the second stage and as the key 490 moves further in the downward direction, the outer portion of the key 490 may come in contact with the upper plunger 440, thereby forcing the upper plate 420 to compress the springs 480 attached to the upper plate 420 and break the contact with the upper bars 460. This may break the second electrically conductive path (the low resistivity path). The key 490 may have a protruding nub 492 that may ride on the housing (not shown) of the dual stage switch 400 or a structure of the UAV to give a mechanical advantage as well as a locking position once contacts between the upper plate 420 and upper bars 460 are broken.

The key may be translated in the opposite direction (e.g., the upward direction) to "switch on" the power. In the first stage, the key may be unlocked and released in the upward direction. The compression built in the lower spring 470 may push the lower plunger 430 in that direction until the lower plate 410 contacts the lower bars 450, thereby creating the first electrically conductive path (e.g., the high resistivity path). The remaining compression in the lower spring 470 may maintain the lower plate 410 against the lower bar 450 as the key 490 is further translated in the upward direction. Similarly, the built compression in the upper springs 480 may push the upper plunger 440 in the upward direction until the upper plate 420 contacts the upper bar 460, thereby creating the first electrically conductive path (e.g., the low resistivity path). The remaining compression in the upper springs 480 may maintain the upper plate 420 against the upper bar 460 as the key 490 is further translated in the upward direction and eventually released.

FIGS. 5A, 5B, 5C, and 5D illustrate yet another example of a dual stage switch 500. In this example, the dual stage switch 500 may implement an electrically conductive housing 502. This housing 502 may be threaded and divided along multiple planes to form different parts. FIG. 5 illustrates four parts 510A, 510B, 510C, and 510D of the housing 502 formed by a division along the vertical and horizontal planes. The four parts 510A-D may be made of an electrically conductive material, such as a highly conductive metal. The four parts 510A-D may be electrically coupled to the UAV's propulsion load and DC battery to form multiple stages for the switching. For example, the lower part 510C may be electrically coupled to the propulsion load and the lower part 510D may be electrically coupled to a DC battery. In comparison, the upper part 510A may be electrically coupled to the lower part 510C by an electrical resistor. Similarly, the upper part 510B may be electrically coupled to the lower part 510D by an electrical resistor. Each of the electrical resistors may have high resistivity in the range of ten ohms (10Ω) to ten kilo ohms (10 kΩ). The embodiments of the present disclosure are not limited to these electrical coupling configurations. Other configurations may be similarly used. Likewise, although the embodiments may be described as using a threaded housing and a threaded key, the housing and/or key need not be threaded.

The electrically conductive housing 502 may be used according to two implementations. A first implementation may necessitate insertion of an electrically conductive key 520 into the housing 502 to switch on the power and removal of the electrically conductive key 520 to switch off the power. This key 520 may include a screw. The first implementation is shown in the FIGS. 5A, 5B, 5C, and 5D. A second implementation may necessitate removal of a dielectric key from the housing to switch on the power and insertion of the dielectric key into the housing to switch off the power. Each of these implementations is further described herein next.

In the first implementation, the four parts 510A-C may be separated by a dielectric material 530. As such, no electrically conductive path may exist absent an inserted conductive key 520. In a "switch on" mode, the key 520 may be inserted from the upper side of the housing 502 first and threaded down to come in contact with the upper parts 510A-B. This may correspond to the first stage of the dual stage switch 500. In this first stage, a first electrically conductive path may be formed by electrically coupling the electrically conductive key 520 with the upper conductive parts 510A-B. This first electrically conductive path may include all four conductive parts 510A-D, the conductive key 520, and the resistors and, thereby, may have high electrical resistivity.

As the key 520 is further threaded down, the key 520 may come in contact with the lower parts 510C-D. This may correspond to the second stage of the dual stage switch 500. In this second stage, a second electrically conductive path may be formed by electrically coupling the electrically conductive key 520 with the conductive lower parts 510C-D. This second electrically conductive path may include the two lower conductive parts 510C-D and the conductive key 520 and, thereby, may have lower electrical resistivity.

In a "switch off" mode, the key 520 may be moved in the opposite direction. The movement may initially break the second electrically conductive path when the electrically conductive key 520 is no longer in contact with the lower conductive parts 510C-D. However, the first electrically conductive path remains until the electrically conductive key 520 is completely removed from the housing. Upon such a removal (e.g., when the first electrically conductive path is broken), a captive screw 522 of the key 520 may stick out allowing the corresponding stage of the dual stage switch 500 (e.g., switch off complete) to be visible. A hole 524 in the key 520 may be used for inserting a pin to lock the dual stage switch 500 in the switch off state. Although the visual indication of the switch-off is illustrated using a captive screw 522, other indicators may also be used. For example, a portion of the key 520 (e.g., a top) may be painted with a highly visible color. That portion becomes visible when the key 520 is removed by an enough distance to break the first electrically conductive path. In another example, a membrane may be positioned at a distance away (e.g., upwards) from the housing 502. Upon rotation to remove the key 520, a contact between the key 520 and the membrane may occur and correspond to breaking the first electrically conductive path. This contact may cause the membrane to vibrate and provide an audible indication of the switch-off. These and other indicators, whether visual, audible, or otherwise, may be similarly repeated at the various stages of the switch. For example, when the key 520 is first removed breaking the second electrically conductive path but not the first electrically conductive path, a portion of the key 520 that becomes visible may be painted with a color coded to that stage.

In the second implementation, the four parts 510A-D may not be separated by a dielectric material. Instead, the dielectric key may be oversized for the housing (e.g., may have a relatively larger diameter). As such, when the dielectric key is inserted, respective parts of the housing may become separated, thereby breaking respective electrically conductive paths. In addition, a set of springs may compress the parts 510A-D or an elastomer material may surround the housing. As such, when the key is removed, the various parts may be compressed and be in contact with each other, thereby creating respective electrically conductive paths.

In the "switch off" mode, the dielectric key may be inserted from the lower side of the housing to effectuate the first stage of the dual stage switch 500. In this first stage, an existing first electrically conductive path formed by the lowers conductive parts 510C-D may be broken. In particular, as the dielectric key is threaded in, the two lower conductive parts 510C-D may become separated, thereby breaking the first electrically conductive path. However, in this stage, an existing second electrically conductive path formed by all four conductive parts 510A-D and the resistors may still exist. In the second stage, the dielectric key is further threaded in to also separate the two upper conductive parts 510A-B. Accordingly, in this stage, the second electrically conductive path may be broken.

In a "switch on" mode, the dielectric key may be moved in the opposite direction. The movement may initially create the second electrically conductive path when the dielectric key is no longer in contact with the upper conductive parts 510A-B. Subsequently, further movement of the dielectric key may also create the first electrically conductive path when the dielectric key is no longer in contact with the lower conductive parts 510C-D (e.g., when the dielectric key is removed from the housing).

In comparison to the components of FIG. 2, the four conductive parts 510A-D may represent electrically conductive members. The threads of the housing, compressing springs, and elastomer material may represent moving members.

Although the two implementations are illustrated with a translational and rotational movement of the key along the vertical and horizontal axes, other types of movements along other directions may also be possible. In addition, the insertion from one side of the housing (e.g., upper portion or lower portion) may be reversed. As such, in the first implementation, insertion and removal of a key may be effectuated through the lower side of the housing. In the second implementation, insertion and removal of a key may be effectuated through the upper side of the housing.

Figure 6:
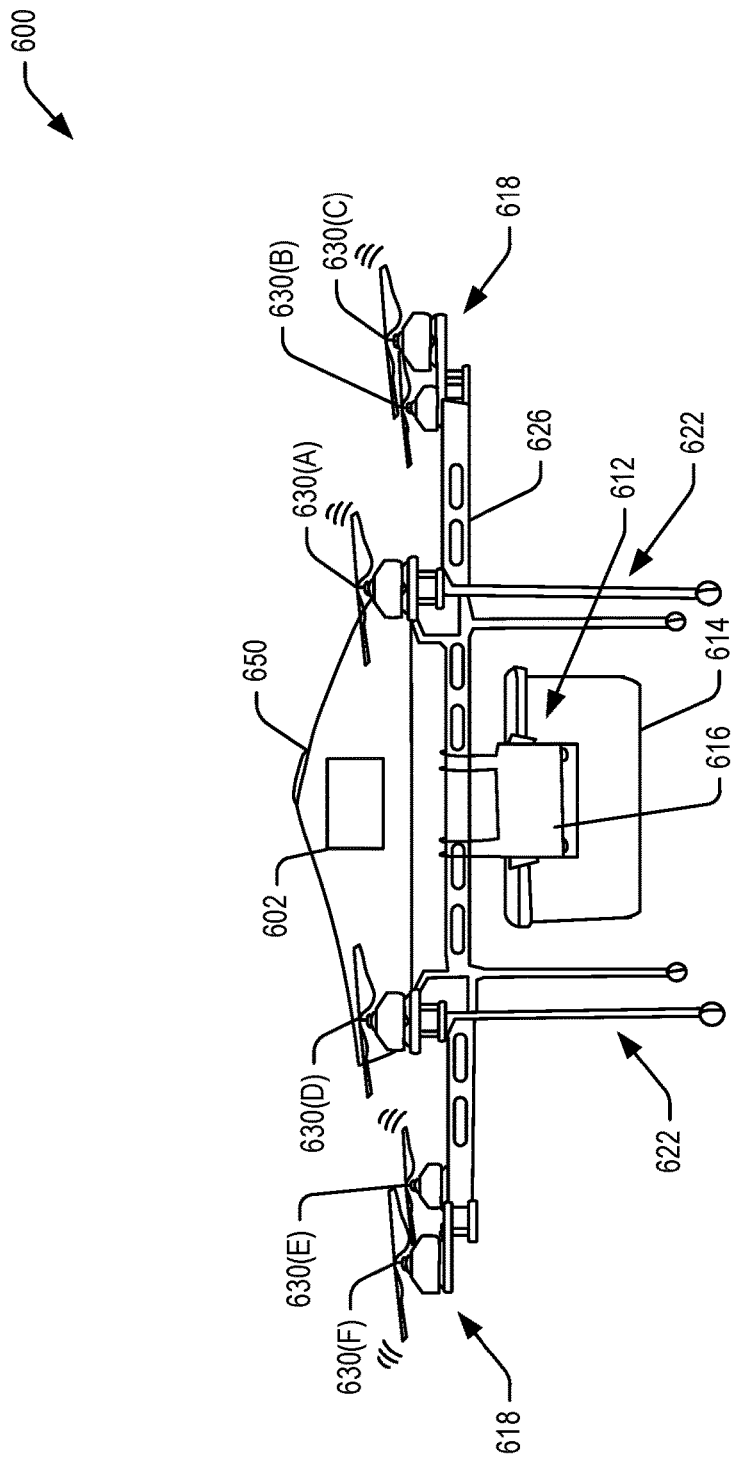
FIG. 6 illustrates an example configuration of an unmanned vehicle implementing a power system, according to embodiments.

Turning next to FIG. 6, an example UAV 600 configured with a power system 602 is illustrated. The power system 602 may include one or more multi-stage switches to electrically couple one or more power sources to one or more loads. The UAV 600 may be designed in accordance with commercial aviation standards and may include multiple redundancies to ensure reliability. In particular, the UAV 600 may include a plurality of systems or subsystems operating under the control of, or at least partly under the control of, a management system. The management system may include an onboard computer hosting a management module for autonomously or semi-autonomously controlling and managing various operations of the UAV 600 and, in some examples, for enabling remote control by a pilot. In an example, the onboard computer may be configured to receive data from a ground computing system. The received data may be used by the management module to control to manage the various operations. In another example, the onboard computer may be configured to receive data from other components of the UAV 600 and to provide some or all of this data to the ground computing system and/or to the management module.

In addition, the various operations controlled and managed by the management system (e.g., the hosted management module) may include managing other components of the UAV 600, such as a propulsion system 618 to facilitate flights. Portions of the management system, including the onboard computer, may be housed under top cover 650. In an example, the management system may include the power system 602, one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 600 and detecting objects) (not shown), and radio-frequency identification (RFID) capability (not shown).

As shown in FIG. 6, the UAV 600 may also include a retaining system 612. The retaining system 612 may be configured to retain payload 614. In some examples, the retaining system 612 may retain the payload 614 using friction, vacuum suction, opposing arms, magnets, and other retaining methods. As illustrated in FIG. 6, the retaining system 612 may include two opposing arms 616 (only one is illustrated) configured to retain the payload 614. The management system may be configured to control at least a portion of the retaining system 612. In some examples, the retaining system 612 may be configured to release the payload 614 in one of a variety of ways. For example, the retaining system 612 (or other system of the UAV 600) may be configured to release the payload 614 with a winch and spool system, by the retaining system 612 releasing the payload, by fully landing on the ground and releasing the retaining system 612, and other methods of releasing the payload 614. In some examples, the retaining system 612 may operate semi-autonomously or autonomously.

Further, the UAV 600 may include a propulsion system 618. In some examples, the propulsion system 618 may include rotary blades or otherwise be a propeller-based system. As illustrated in FIG. 6, the propulsion system 618 may include a plurality of propulsion devices, a few of which, 630(A)-630(F), are shown in this view. Each propeller device may include one propeller, a motor, wiring, a balance system, a control mechanism, and other features to enable flight. In some examples, the propulsion system 618 may operate at least partially under the control of the management system. In some examples, the propulsion system 618 may be configured to adjust itself without receiving instructions from the management system. Thus, the propulsion system 618 may operate semi-autonomously or autonomously.

The UAV 600 may also include landing structure 622. The landing structure 622 may be adequately rigid to support the UAV 600 and the payload 614. The landing structure 622 may include a plurality of elongated legs that may enable the UAV 600 to land on and take off from a variety of different surfaces. The plurality of systems, subsystems, and structures of the UAV 600 may be connected via frame 626. The frame 626 may be constructed of a rigid material and be capable of receiving via different connections the variety of systems, sub-systems, and structures. For example, the landing structure 622 may be disposed below the frame 626 and, in some examples, may be formed from the same material and/or same piece of material as the frame 626. The propulsion system 618 may be disposed radially around a perimeter of the frame 626 or otherwise distributed around the frame 626. In some examples, the frame 626 may attach or be associated with one or more fixed wings.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An unmanned aerial vehicle (UAV), comprising:
   a frame;
   a power load;
   a power source; and
   an electrical switch comprising a moving member and a plurality of electrically conductive members, the plurality of electrically conductive members configured to move between mechanical positions in a predefined order to electrically couple the power load and the power source, wherein:
      a first electrically conductive member is configured to move to a first mechanical position and form a first electrically conductive path between the power load and the power source based at least in part on the first mechanical position, the first electrically conductive path having first electrical resistivity;
      a second electrically conductive member is configured to move to a second mechanical position and form a second electrically conductive path between the power load and the power source based at least in part on the second mechanical position, the second electrically conductive path having second electrical resistivity different from the first electrical resistivity; and
      the moving member is configured to move the second electrically conductive member based at least in part on movement of the first electrically conductive member to the first mechanical position such that movement of the second electrically conductive member to the second mechanical position occurs based at least in part on the movement of the first electrically conductive member according to the predefined order.

2. The UAV of claim 1, wherein the first electrically conductive member and the second electrically conductive member are configured to move along a same axis based at least in part on movement of a key inserted in the electrical switch, wherein the first electrically conductive member comprises a first contact plate, wherein the second electrically conductive member comprises a second contact plate, and wherein the moving member comprises a plunger attached to the second contact plate and configured to move the second contact plate along the same axis.

3. The UAV of claim 1, wherein the first electrically conductive member and the second electrically conductive member are configured to rotate along a same plane based at least in part on movement of a key inserted in the electrical switch, wherein the first electrically conductive member comprises a first contact plate, wherein the second electrically conductive member comprises a second contact plate, and wherein the moving member comprises an arm attached to the second contact plate and configured to engage the first contact plate until the first contact plate is rotated to the first mechanical position.

4. The UAV of claim 1, wherein the electrical switch comprises an electrically conductive threaded housing configured to accept an electrically conductive threaded key, wherein the electrically conductive threaded housing is divided into at least four parts along at least two planes, wherein the at least four parts are separated by dielectric material, wherein the first electrically conductive member comprises two parts of the at least four parts, and wherein the second electrical conductive member comprises two other parts of the at least four parts.

5. The UAV of claim 1, wherein the electrical switch comprises an electrically conductive threaded housing configured to accept a dielectric threaded key and an elastomer member surrounding the electrically conductive threaded housing, wherein the electrically conductive threaded housing is divided into at least four parts along at least two planes, wherein the first electrically conductive member comprises two parts of the at least four parts, and wherein the second electrical conductive member comprises two other parts of the at least four parts.

6. A switch to selectively connect a power source of an unmanned aerial vehicle to a load of the unmanned aerial vehicle, the switch comprising:
   a plurality of members configured to move between switch positions in a predefined order such that the load and the power source are electrically coupled or electrically decoupled via the switch based at least in part on the predefined order, wherein:
      the power source comprises a direct current (DC) battery providing a current in a range of one to three hundred amperes and a voltage in a range of thirteen to one hundred volts;
      a first member is configured to move to a first switch position and form a first electrically conductive path having a first electrical property;
      a second member is configured to move to a second switch position and form a second electrically conductive path having a second electrical property different from the first electrical property; and
      a third member is configured to move the second member based at least in part on movement of the first member to the first switch position such that movement of the second member to the second switch position occurs based at least in part on the movement of the first member to the first switch position.

7. The switch of claim 6, wherein the first switch position corresponds to an initial stage of switching on power to the load from the power source, wherein the first electrical property comprises first electrical resistivity, wherein the second electrical property comprises second electrical resistivity, wherein the second switch position corresponds to a final stage of switching on the power, wherein the predefined order sequences the initial stage before the final stage for switching on the power, and wherein the first electrical resistivity is larger than the second electrical resistivity such that the load and the power source are electrically coupled via a higher electrical resistance to suppress in-rush current and electrical sparks in the initial stage before being electrically coupled via a lower electrical resistance in the final stage.

8. The switch of claim 6, wherein the movement of the first member comprises a push and hold, and wherein the movement of the second member comprises a rotation.

9. The switch of claim 6, wherein the plurality of members are configured to move between the switch positions based at least in part on a key, wherein the switch is configured to lock the key and move the first member to the first switch position and the second member to the second switch position based at least in part on movement of the key, and wherein the switch is configured to release the key based at least in part on the second member being in the second switch position.

10. The switch of claim 6, wherein the second member being in the second switch position corresponds to also the first member being in the first switch position based at least in part on the predefined order, wherein the load and the power source are electrically coupled when at least one of the first member or the second member is in a respective switch position, and wherein the load and the power source are electrically decoupled when neither of the first member nor the second member is in the respective switch position.

11. The switch of claim 6, wherein the members are configured to move between the switch positions based at least in part on movement of a key, wherein the switch comprises one or more springs, and wherein the members are configured to stay in or move away from the switch positions based at least in part on one or more loads of the one or more springs, wherein the one or more loads are based at least in part on the movement of the key.

12. An aerial vehicle, comprising:
a load; and
a switch that comprises a plurality of members configured to move between switch positions in a predefined order such that the load is and electrically coupled to a power source or electrically decoupled from the power source based at least in part on the predefined order, wherein:
the members are configured to switch on power to the load for a flight of the aerial vehicle based at least in part on movement of a key coupled to the switch,
the switch is configured to decouple the key based at least in part on the plurality of members being in the switch positions prior to the flight;
a first member is configured to move to a first switch position and form a first electrically conductive path having a first electrical property;
a second member is configured to move to a second switch position and form a second electrically conductive path having a second electrical property different from the first electrical property; and
a third member is configured to move the second member based at least in part on movement of the first member to the first switch position such that movement of the second member to the second switch position occurs based at least in part on the movement of the first member to the first switch position.

13. The aerial vehicle of claim 12, wherein the first electrical property comprises first electrical resistivity, wherein the second electrical property comprises second electrical resistivity, wherein the first member comprises a first electrically conductive contact plate, wherein the second member comprises a second electrically conductive contact plate, and wherein the first electrically conductive path comprises a resistor such that the first electrical resistivity is larger than the second electrical resistivity.

14. The aerial vehicle of claim 12, wherein the first electrical property comprises first electrical resistivity, wherein the second electrical property comprises second electrical resistivity, wherein the first member comprises a first electrically conductive contact plate, wherein the second member comprises a second electrically conductive contact plate, and wherein the first electrically conductive contact plate is configured to render the first electrical resistivity larger than the second electrical resistivity.

15. The aerial vehicle of claim 12, wherein the switch is mechanically coupled to the key, wherein the first member comprises a first contact plate, wherein the first switch position corresponds to a first contact bar electrically coupled to the load, wherein the second member comprises a second contact plate, wherein the second switch position corresponds to a second contact bar electrically coupled to the load, wherein the third member comprises a first plunger and a second plunger configured to move along a same axis, wherein the first plunger is mechanically coupled to the first contact plate and to a first spring, wherein the second plunger is mechanically coupled to the second contact plate and to a second spring, wherein, upon movement of the key along the same axis, the first plunger moves the first contact plate for mechanical coupling with the first contact bar and the second plunger moves the second contact plate for mechanical coupling with the second contact bar, and wherein, upon a mechanical decoupling of the key and the switch, the first spring maintains a first mechanical coupling between the first contact plate and the first contact bar and the second spring maintains a second mechanical coupling between the second contact plate and the second contact bar.

16. The aerial vehicle of claim 12, wherein the switch is mechanically coupled to the key, wherein the first member comprises a first contact plate, wherein the first switch position corresponds to a first contact bar electrically coupled to the load, wherein the second member comprises a second contact plate and an arm corresponding to the third member, wherein the second switch position corresponds to a second contact bar electrically coupled to the load, and wherein, upon movement of the key, the second contact plate rotates along a plane and the arm engages the first contact plate such that the first contact plate rotates along the plane and such that, upon a first mechanical coupling between the first contact plate and the first contact bar, the second contact plate continues to rotate along the plane while the first mechanical coupling is maintained and until a second mechanical coupling is established between the second contact plate and the second contact bar.

17. The aerial vehicle of claim 12, wherein the key comprises an electrically conductive key, wherein the switch comprises an electrically conductive housing that is divided in at least four parts, wherein the at least four parts are separated by a dielectric material, wherein the first member comprises two parts of the at least four parts, wherein the second member comprises two other parts of the at least four parts, and wherein, upon insertion of the electrically conductive key in the electrically conductive housing, the first electrically conductive path is formed based at least in part on a first mechanical coupling between the electrically conductive key and the two parts of the first member and the second electrically conductive path is formed based at least in part on a second mechanical coupling between the electrically conductive key and the two other parts of the second member.

18. The aerial vehicle of claim 12, wherein the key comprises a dielectric key, wherein the switch comprises an electrically conductive housing and an elastomer material surrounding at least a portion of the electrically conductive housing, wherein the electrically conductive housing is divided in at least four parts, wherein the first member comprises two parts of the at least four parts, wherein the second member comprises two other parts of the at least four parts, wherein, upon removal of the dielectric key from the electrically conductive housing, the first electrically conductive path is formed based at least in part on a first mechanical coupling between the two parts of the first member and the second electrically conductive path is formed based at least in part on a second mechanical coupling between the two other parts of the second member, and wherein, upon the removal of the dielectric key, the first mechanical coupling and the second mechanical coupling are maintained based at least in part on the elastomer material.

\* \* \* \* \*